US006749793B1

(12) United States Patent
Hagenah

(10) Patent No.: US 6,749,793 B1
(45) Date of Patent: Jun. 15, 2004

(54) METHOD FOR MECHANICALLY TREATING CONCRETE BLOCKS

(75) Inventor: Gerhard Hagenah, Worpswede (DE)

(73) Assignee: SF-Kooperation GmbH Beton-Konzepte, Bremen (DE)

( * ) Notice: Subject to any disclaimer, the term of this patent is extended or adjusted under 35 U.S.C. 154(b) by 0 days.

(21) Appl. No.: 09/787,686

(22) PCT Filed: Sep. 16, 1999

(86) PCT No.: PCT/EP99/06855

§ 371 (c)(1),
(2), (4) Date: Mar. 21, 2001

(87) PCT Pub. No.: WO00/20182

PCT Pub. Date: Apr. 13, 2000

(30) Foreign Application Priority Data

Oct. 1, 1998 (DE) ........................................ 198 45 174

(51) Int. Cl.$^7$ ................................................ B29C 7/02

(52) U.S. Cl. ....................... 264/345; 264/340; 264/346; 241/27

(58) Field of Search ................................ 264/340, 345, 264/346; 241/27

(56) References Cited

U.S. PATENT DOCUMENTS 4,263,240 A 4/1981 Postell

FOREIGN PATENT DOCUMENTS

| | | | |
|---|---|---|---|
| DE | 3526782 A | | 1/1987 |
| DE | 3814148 A1 | | 11/1989 |
| DE | 9215916 U | | 3/1993 |
| DE | 19603502 A | | 9/1997 |
| EP | 0339308 A | | 11/1989 |
| EP | 0 894 590 A1 | * | 2/1998 |

* cited by examiner

*Primary Examiner*—Stephen J. Lechert, Jr.
(74) *Attorney, Agent, or Firm*—Technoprop Colton LLC

(57) ABSTRACT

Method of, and apparatus for, treating concrete blocks (10) in order to carry out an artificial aging process. For the mechanical treatment of the concrete blocks (10), the latter are positioned in a desired formation on a table top (14). Treatment bodies (17) are moved over the top side of the concrete blocks (10) with the table top (14) inclined. In this case, the concrete blocks (10) are arranged obliquely relative to one another, with the result that projecting edges and corners are partially removed.

11 Claims, 3 Drawing Sheets

Fig. 2
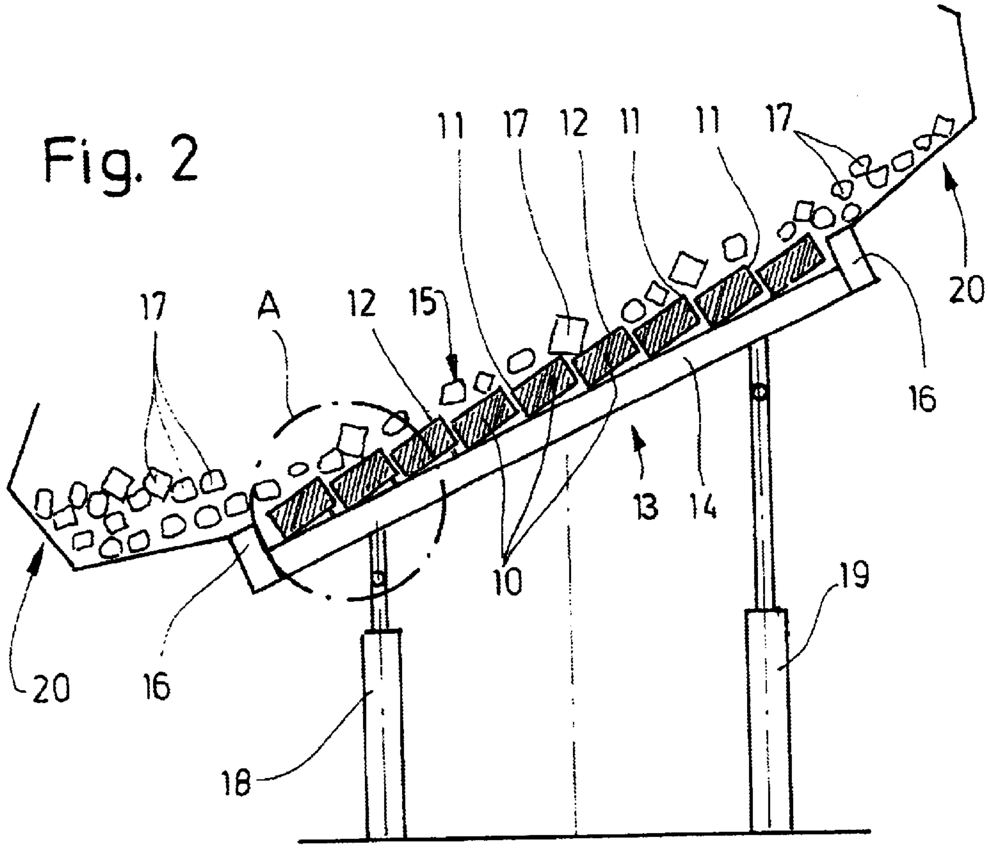
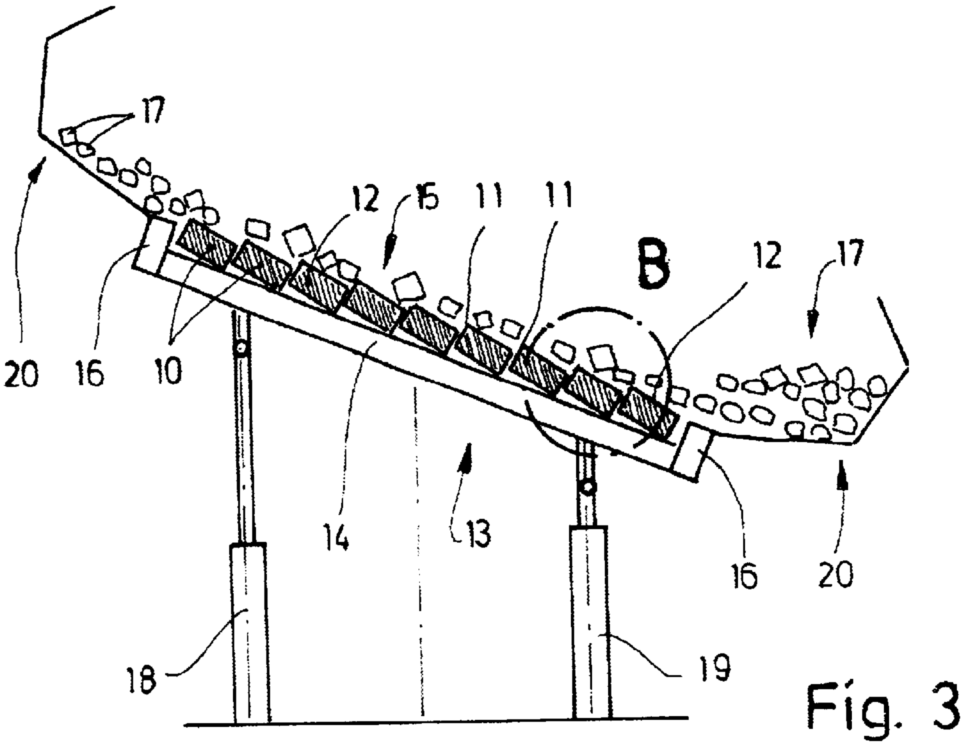
Fig. 3

METHOD FOR MECHANICALLY TREATING CONCRETE BLOCKS

This application is a 371 of PCT/EP99/06855, filed Sep. 16, 1999.

BACKGROUND OF THE INVENTION

1. Technical Field

The invention relates to a method of mechanically treating concrete blocks by the irregular removal of fragments in the region of edges and corners. The invention also relates to an apparatus for implementing the method.

2. Prior Art

Concrete blocks, in particular concrete paving blocks, are frequently subjected to mechanical treatment in which edges and corners of the concrete blocks are irregularly knocked off. The intention is thus for the concrete blocks to achieve the outer appearance of an (artificially) aged block.

The method of artificially aging concrete blocks which has been used in practice up until now consists in the finished, set concrete blocks which have been cured fully by corresponding storage being moved through a rotating drum. In this case, corners and edges are irregularly knocked off within the drum, to be precise by reciprocal mechanical treatment of the blocks, but also by the latter striking against the drum wall (so-called tumbling of concrete blocks).

The tumbling method is associated with the considerable development of noise and dust. It is also disadvantageous that the treated concrete blocks occur as bulk goods, that is to say they leave the drum in a disordered formation. This makes further processing of the concrete blocks more difficult, in particular in the case of mechanical laying of the concrete blocks for producing paving. In this case, the disordered blocks have to be positioned and stacked manually, with corresponding outlay, for the purpose of producing formations in order to be able to be transported to the construction site in a manner appropriate for laying.

BRIEF SUMMARY OF THE INVENTION

The object of the invention is to improve a method of, and an apparatus for, mechanically treating the paving blocks in order to make available concrete-blocked units which can be processed with a low level of aggravating noise and dust being produced.

In order to achieve this object, the method according to the invention is characterized in that a group of the concrete blocks—block group—is positioned on a base such that top edges and corners are at least temporarily exposed and/or, offset in relation to the respectively adjacent concrete blocks, project beyond these adjacent concrete blocks, and in that treatment bodies are moved over the thus arranged group of concrete blocks in order to treat the projecting edges and corners mechanically.

According to the invention, the concrete blocks are at rest during the treatment, but are positioned relative to one another such that edges and corners are exposed as upwardly directed projections, with the result that treatment bodies moved over the top side of the block group can remove the relevant edges and corners irregularly.

The block group is preferably positioned in an inclined plane, the treatment bodies being moved over the concrete blocks, which are offset in an imbricated manner, under their own weight with rolling or sliding action. The base for the block group, in particular a treatment table, is movable, with the result that the concrete blocks can be arranged in an imbricated manner in different positions relative to one another in order for all the edges in the region of a top side of the concrete blocks to be treated.

The block group treated in this way comprises concrete blocks which are positioned relative to one another in a manner necessary for the storage and/or the transportation and/or mechanical laying as paving blocks. A block group may thus comprise a transporting and laying unit or a plurality of units positioned one beside the other.

According to a further proposal of the invention, the operation of mechanically treating the concrete blocks is integrated in the production process of the same. Following setting in the region of the drying chambers, the concrete blocks are fed directly to the mechanical-treatment apparatus according to the invention. Intermediate storage in order to be cured fully is dispensed with.

BRIEF DESCRIPTION OF THE DRAWINGS

Further details of the method according to the invention and of the apparatus are explained more specifically hereinbelow with reference to the drawings, in which:

FIG. 2 shows a side view or cross section of the apparatus according to FIG. 1 in an oblique position, FIG. 3 shows the apparatus according to FIGS. 1 and 2 in another position.

DETAILED DESCRIPTION OF THE PREFERRED EMBODIMENTS

Figure 4:
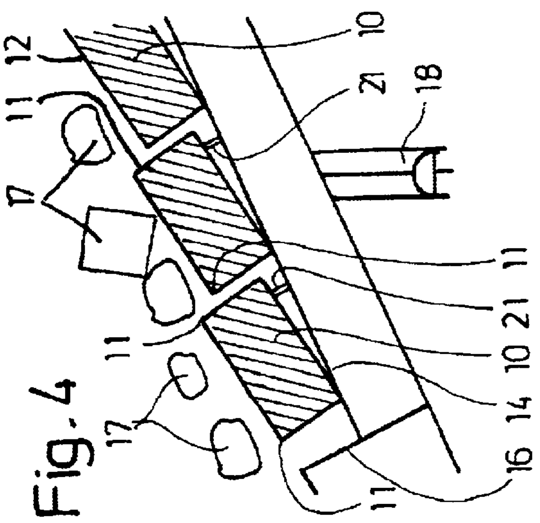
FIG. 4 shows, on an enlarged scale, a detail of the apparatus according to FIG. 2.

The drawings show the treatment of concrete blocks 10. The latter are cuboidal green blocks which are to be used as paving blocks, that is to say for forming a ground covering. The concrete blocks 10 may be of any desired configuration for the treatment, that is to say they may also be provided with protrusions and depressions in order to achieve a horizontal or vertical interlocking arrangement.

The concrete blocks 10 are treated mechanically so as to give the appearance of artificial aging. Primarily, for this purpose, edges and corners of the concrete blocks 10 are treated by way of material (concrete) being knocked off irregularly. This treatment is carried out such that all the concrete blocks are configured differently, that is to say there is no correspondence between the break-off points.

A special feature resides in the fact that, in the case of the treatment method illustrated, the concrete blocks 10 are treated mechanically merely in the region of a top side. It is thus the case that only top transverse edges 11 and longitudinal edges 12 have material removed from them irregularly by mechanical elements. In a paving arrangement made of concrete blocks 10 treated in this way, said transverse edges 11 and longitudinal edges 12 which are provided with break-off points are likewise located on the (visible) top side of the paving. The bottom regions and edges of the concrete blocks 10, which are located in the ground, thus remain untreated, with the result that spacers provided, for example, even on upright side surfaces are not adversely affected.

For the treatment of the concrete blocks 10, the latter are positioned on a base, to be precise in a formation which corresponds to the arrangement of the concrete blocks 10 in the region of the paving. This arrangement of the concrete blocks 10 also expediently corresponds to that in a stack of concrete blocks 10. The concrete blocks 10 for producing paving are usually stacked in layers on pallets. The arrangement of the concrete blocks 10 within a layer corresponds to that during the mechanical treatment. It is expedient for in each case one layer of a stack of concrete blocks 10 to be a laying unit, that is to say a group of concrete blocks 10 which a machine can lay mechanically as a unit.

The concrete blocks 10 are arranged in this formation on a treatment table 13. The latter is provided with a table top 14 as a bearing means for a group of concrete blocks 10, namely for a block group 15. The table top 14 is an essentially planar load-bearing element with an encircling border surround 16 for the concrete blocks 10 or the block group 15. The table top 14 or the bearing surface defined by the border surround 16 is dimensioned such that it is possible to displace the concrete blocks 10 of the block group 15 as a unit within the border surround 16 on the table top 14. In order to treat the concrete blocks 10 in the manner described, treatment bodies 17 are moved over the (free) top side of the concrete blocks 10 on the table top 14. A sufficient number of such treatment bodies 17 are moved back and forth, if appropriate a number of times, over the top side of the concrete blocks 10 without guidance, the treatment bodies 17 executing a rolling or sliding action, in some cases being briefly raised up from the top side of the concrete blocks 10 in the process.

The treatment bodies 17 may consist of different materials, albeit of a material which is harder than concrete. For example, the treatment bodies 17 may be formed from granite, that is to say they may be granite blocks with corners and edges. Alternatively, it is also possible for the treatment bodies 17 to consist of metal. Different types of treatment bodies 17 may be used together in order to achieve corresponding treatment effects.

All the treatment bodies 17 are moved over the top side of the concrete blocks 10, with their own weight being utilized in the process. For this purpose, the block group 15 is moved into an inclined position, to be precise by a corresponding tilting movement of the table top 14. Said table top may be expediently be tilted with different inclinations in time with the operating procedure. The maximum inclination of the table top 10 and/or of the block group 15 may be 40° or up to 45°. In this end-inclination position, all the treatment bodies 17 are moved from one side of the block group 15, over the latter, to the other side. In the exemplary embodiment shown, the corresponding tilting movement of the table top 14 is executed with the aid of pressure-medium cylinders 18, 19. The tilting movement may be executed in a number of directions, that is to say in the longitudinal direction and transverse direction in relation to the treatment table 13.

The material for treating the concrete blocks 10, that is to say the treatment bodies 17, is/are used a number of times in each case, that is to say is/are thus part of the treatment apparatus. For this purpose, the treatment table 13 is enclosed all the way round by a collecting trough 20. The latter is in the form of U-shaped or similarly shaped collecting parts which are fastened on the border of the treatment table 13 or on the border surround 16. That part of the collecting trough 20 which is respectively at the bottom when the table top 14 is in the oblique position collects the treatment bodies 17 if these have been moved over the block group 15. By virtue of movement into the other tilting position, the treatment bodies 17 are then moved over the block group 15 again and collected by the part of the collecting trough 20 on the opposite side.

Figure 5:
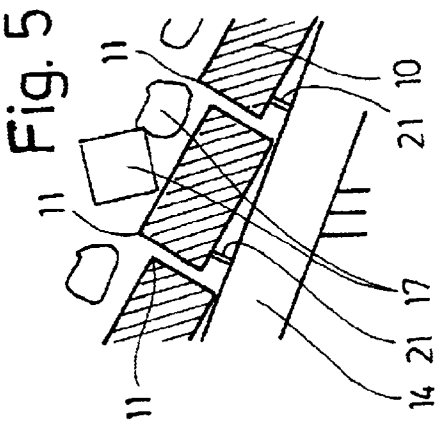
FIG. 5 shows, likewise on an enlarged scale, a detail of FIG. 3.
Figure 1:
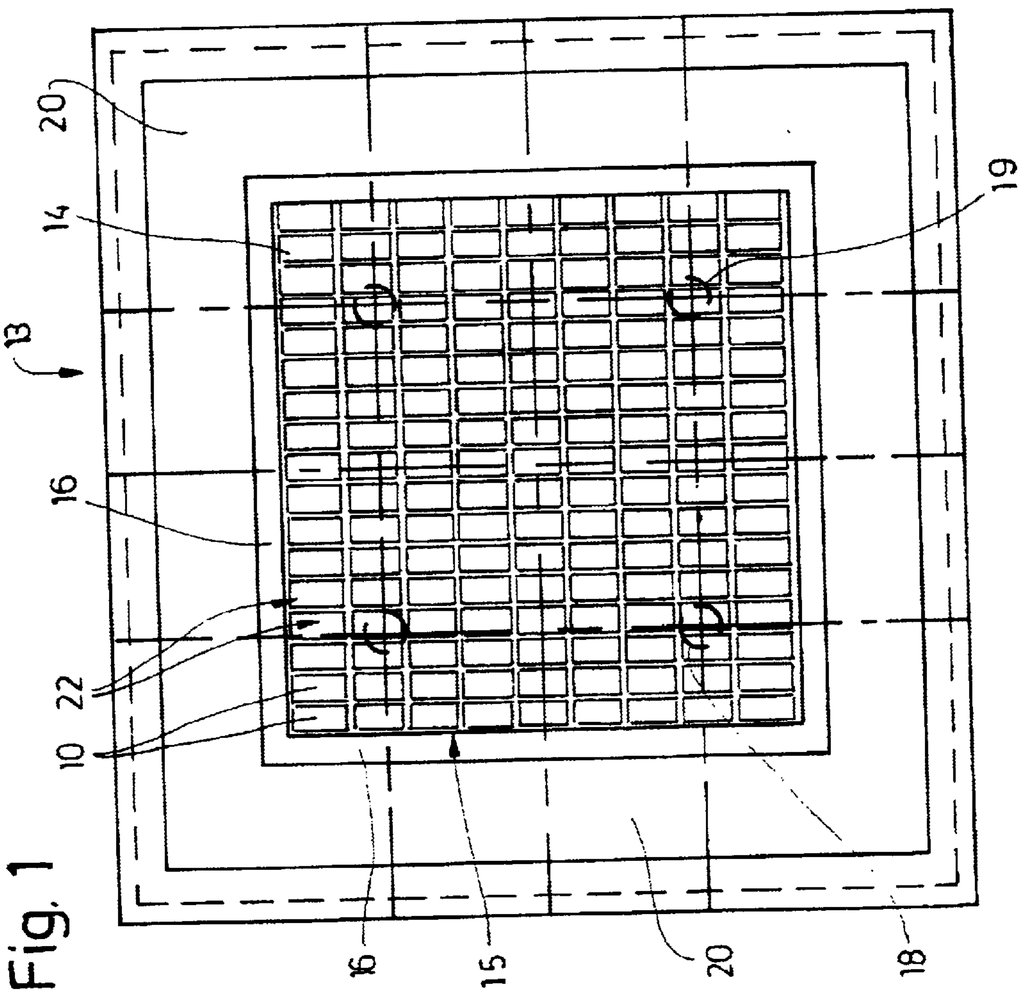
FIG. 1 shows a schematic plan view of an apparatus for mechanically treating concrete blocks.

For effective treatment of the concrete blocks 10, the latter are positioned in a specific manner relative to one another during the treatment, that is to say when the treatment bodies 17 are moved over the concrete blocks 10, in this case, the concrete blocks 10 are arranged in an offset position in relation to one another such that at least some of the (top) edges, namely transverse edges 11 and longitudinal edges 12, project beyond adjacent concrete blocks 10. In the present exemplary embodiment, the concrete blocks 10 are offset in relation to one another in an imbricated manner or in sawtooth form. As a result, transverse edges 11 respectively project to a considerable extent beyond the top surface of the adjacent concrete block 10 (FIGS. 4 and 5). These regions of the concrete blocks 10 thus form resistances or elevations in relation to the treatment body 17 moved over the block group 15. This results in regions being knocked irregularly out of the edges.

In order for all the top edges all the way round, namely transverse edges 11 and longitudinal edges 12, to be treated in this manner, there has to be a change in position of the concrete blocks 10 relative to one another. This can be brought about by movable elements which raise or lower the concrete blocks 10 into alternating positions. In the present exemplary embodiment, the concrete blocks 10 move automatically into offset treatment positions. For this purpose, supporting elements for the concrete blocks, namely supporting ridges 21, are arranged on the top side of the table top 14. In the present case, the supporting ridges are arranged in a fixed manner, to be precise such that each concrete block 10 rests eccentrically, and thus obliquely, on a supporting ridge 21. When the table top 14 is tilted into another, opposite oblique position, the concrete blocks slide along the supporting ridges 21, by way of their underside, into another, opposite oblique position, with the result that the transverse edges 11 which are at a lower level in FIG. 4 move into an elevated position in which they project beyond the adjacent concrete block 10. The supporting elements may be designed and arranged such that corresponding oblique positions are achieved with transversely directed tilting movements of the treatment table 13.

In the present example, the concrete blocks 10 are arranged in block rows 22 within the block group 15. The supporting ridges 21 are arranged such that in each case a complete block row 22 is positioned in the manner illustrated in FIGS. 4 and 5.

Figure 6:
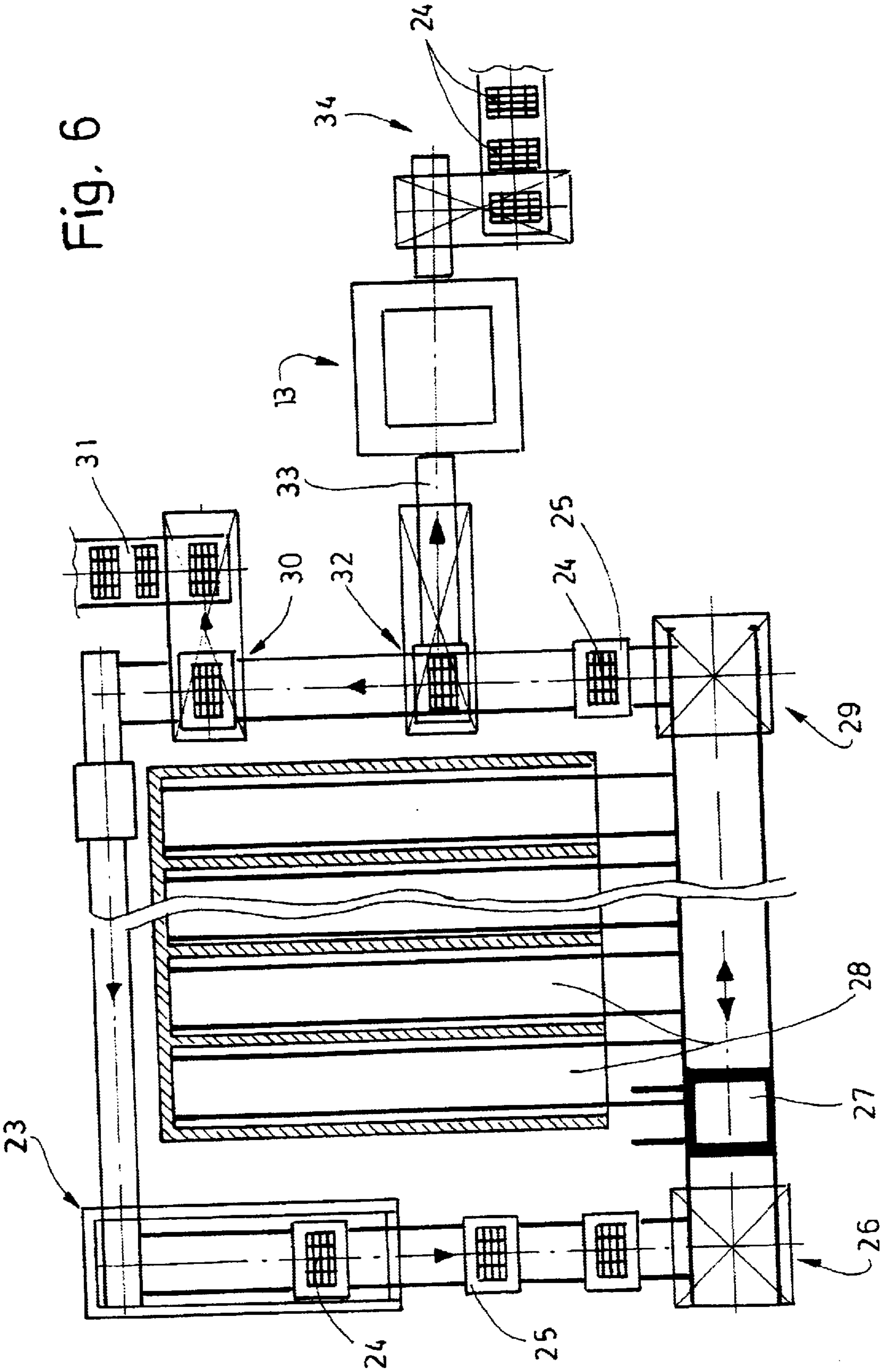
FIG. 6 shows a schematic plan view of an installation for producing concrete blocks with a mechanical-treatment arrangement.

The abovedescribed treatment apparatus and the treatment process may advantageously be integrated in the process of producing concrete blocks 10. FIG. 6 shows a schematic plan view of a block-production installation. The latter comprises a block-forming machine 23. In the region of the latter, in each case one layer of concrete blocks 10, that is to say a block layer 24, is produced on a base board 25. The newly produced concrete blocks 10, that is to say the block layer 24, is conveyed, on this base board 25, into the region of a lifting ladder 26. The latter stacks the base boards 25 with in each case one block layer 24 one above the other. A unit comprising a plurality of base boards 25 is then received by a fork-lift truck 27 and transferred to one of a number of drying chambers 28. In the region of the latter, the concrete cures under the action of heat. The concrete blocks 10 remain in the drying chambers 28 for a duration of approximately 24 h. Thereafter, the fork-lift truck 27 removes the set concrete blocks 10—on the base boards 25—from the drying chambers 28. In the region of a lowering ladder 29, the base boards 25, with in each case one block layer 24, are separated again and conveyed in the direction of a destacker 30. The latter removes the set concrete blocks 10 or the block layer 24 from the base board 25. The concrete blocks are fed, via a conveyor 31, to a storage area in order to be cured fully over a period of from 8 to 10 days. The emptied base boards 25 are fed to he block-forming machine 23 again.

In the present exemplary embodiment, the concrete blocks 10 cured over 24 h, rather than being conveyed directly to the storage area, are removed from the base boards 25 via a preliminary stacker 32. A transverse conveyor 33 feeds the concrete blocks 10, namely the block layers 24, to the treatment station, that is to say the treatment table 13. The dimensions here are selected such that a plurality of block layers 24 together form a block group 15 on the treatment table 13. The treated concrete blocks 10 are pushed off the treatment table 13 again, onto a removal conveyor 34, expediently in sub-groups—corresponding to a block layer 24. Said removal conveyor transports the concrete blocks 10 to a storage area for curing purposes. The abovedescribed treatment of the concrete blocks 10 in order to produce artificial aging is, accordingly, carried out before the concrete has set fully, that is to say following a curing process of approximately 24 h. The operations of transferring the block layers 24 to the treatment table 13 and of pushing the treated concrete blocks 10 off may expediently take place such that the incoming concrete blocks 10 or block layers 24 which are to be treated push off from the table top 14, onto the removal conveyor 34, those concrete blocks or block layers which have already been treated.

List of Designations

10 Concrete block
11 Transverse edge
12 Longitudinal edge
13 Treatment table
14 Table top
15 Block group
16 Border surround
17 Treatment body
18 Pressure-medium cylinder
19 Pressure-medium cylinder
20 Collecting trough
21 Supporting ridge
22 Block row
23 Block-forming machine
24 Block layer
25 Base board
26 Lifting ladder
27 Fork-lift truck
28 Drying chamber
29 Lowering ladder
30 Destacker
31 Conveyor
32 Preliminary stacker
33 Transverse conveyor
34 Removal conveyor

What is claimed is:

1. A method of mechanically treating concrete blocks by the irregular removal of fragments in the region of edges and corners, characterized in that a group of concrete blocks (10) forming a block group (15) is positioned on a base such that top edges (11, 12) and corners are at least temporarily exposed and, offset in relation to the respectively adjacent concrete blocks (10), project beyond these adjacent concrete blocks, and in that treatment bodies (17) are moved over the thus arranged block group (15) in order to treat the projecting edges and corners.

2. The method as claimed in claim 1, characterized in that the concrete blocks (10) within the block group (15) are offset in relation to one another in an imbricated manner or in sawtooth form, preferably with alternating relative positions.

3. The method as claimed in claim 2, characterized in that the concrete blocks (10) are located in an inclined plane with a preferably alternating direction of inclination, and in that the treatment bodies (17) are moved over the concrete blocks (10) under their own weight with the rolling or sliding action.

4. The method as claimed in claim 1, characterized in that the concrete blocks (10) are located in an inclined plane with an alternating direction of inclination, and in that the treatment bodies (17) are moved over the concrete blocks (10) under their own weight with rolling or sliding action.

5. The method as claimed in claim 1, characterized in that by changing the inclination of the base (14), the concrete blocks (10) can be moved, under their own weight, into different imbricated or sawtooth-form relative positions such that edges (11, 12) alternately move into a position appropriate for treatment.

6. The method as claimed in claim 5, characterized in that the base is a table top (14).

7. The method as claimed in claim 1, characterized in that the concrete blocks (10) within the block group (15) are positioned relative to one another in a manner appropriate for storage, transportation and for laying within a paving arrangement and, once the edges and corners have been treated, are transported away, and laid, without any change in position relative to one another.

8. The method as claimed in claim 7, characterized in that the concrete blocks (10) are laid in a mechanical manner.

9. The method as claimed in claim 1, characterized in that following the curing of the concrete, concrete blocks (10) are subjected to mechanical treatment and are then stored, in order to set fully.

10. The method as claimed in claim 9, characterized in that the curing of the concrete is a treatment for approximately 24 h in drying chambers.

11. The method as claimed in claim 9, characterized in that the concrete blocks (10) are stored in stacks of a plurality of block layers (24) one above the other.

* * * * *